(12) United States Patent
Sullivan et al.

(10) Patent No.: US 8,001,253 B2
(45) Date of Patent: *Aug. 16, 2011

(54) NETWORK ACCESS USING NETWORK IDENTIFICATION

(75) Inventors: Bryan L. Sullivan, Sammamish, WA (US); Ileana A. Leuca, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/876,856

(22) Filed: Sep. 7, 2010

(65) Prior Publication Data

US 2010/0332656 A1   Dec. 30, 2010

Related U.S. Application Data (63) Continuation of application No. 12/467,841, filed on May 18, 2009, now Pat. No. 7,805,521, which is a continuation of application No. 09/968,528, filed on Oct. 2, 2001, now Pat. No. 7,548,978.

(60) Provisional application No. 60/237,438, filed on Oct. 3, 2000.

(51) Int. Cl.
G06F 15/16 (2006.01)

(52) U.S. Cl. ......................................................... 709/227

(58) Field of Classification Search .................. 709/219, 709/220, 223, 227, 207; 455/432.1, 405, 455/406; 726/4

See application file for complete search history.

(56) References Cited

U.S. PATENT DOCUMENTS

| | | | |
|---|---|---|---|
| 5,564,068 A | 10/1996 | Nguyen | |
| 5,577,110 A | 11/1996 | Aquino | |
| 5,673,306 A | 9/1997 | Amadon et al. | |
| 5,819,178 A | 10/1998 | Cropper | |
| 5,881,234 A | 3/1999 | Schwob | |
| 5,898,780 A | 4/1999 | Liu et al. | |
| 5,915,214 A | 6/1999 | Reece et al. | |
| 6,018,653 A | 1/2000 | Hietalahti et al. | |
| 6,029,062 A * | 2/2000 | Hanson | 455/408 |
| 6,032,044 A | 2/2000 | Shannon et al. | |
| 6,185,413 B1 | 2/2001 | Mueller et al. | |
| 6,192,132 B1 | 2/2001 | Chavez et al. | |
| 6,266,690 B1 | 7/2001 | Shankarappa et al. | |
| 6,400,722 B1 * | 6/2002 | Chuah et al. | 370/401 |
| 6,434,627 B1 | 8/2002 | Millet et al. | |
| 6,804,720 B1 | 10/2004 | Vilander et al. | |
| 6,880,001 B1 | 4/2005 | Jaakkola et al. | |
| 7,162,220 B2 * | 1/2007 | Hanson | 455/405 |
| 7,548,978 B2 | 6/2009 | Sullivan et al. | |
| 7,673,328 B1 | 3/2010 | Kojima | |
| 7,716,492 B1 | 5/2010 | Saulpaugh et al. | |
| 7,716,722 B2 | 5/2010 | Swift et al. | |
| 7,738,886 B1 * | 6/2010 | Connolly et al. | 455/461 |

(Continued)

*Primary Examiner* — Kevin Bates
*Assistant Examiner* — Benjamin Ailes (57) ABSTRACT

A network system that identifies a home network of a user by a network identification in an access request. When the access request is received in a network, the accessed network extracts a network identification from the access request and determines whether the access request is received from a subscriber or non-subscriber. If a non-subscriber, then a foreign network is identified and a network identification database is consulted to retrieve contact information for the foreign network. If the contact information is successfully retrieved, then the user may be routed to the foreign network (home network of the user). Otherwise (if the contact information is not in the network identification database), the user may be denied any access, and a purchase agreement for connect services may be offered.

20 Claims, 7 Drawing Sheets

U.S. PATENT DOCUMENTS 7,805,521 B2 9/2010 Sullivan et al.
7,912,856 B2 * 3/2011 Hannel et al. ................. 707/781
2004/0249927 A1 12/2004 Pezutti
2006/0223531 A1 10/2006 Hanson

* cited by examiner

| Domain Name | Foreign Network Name | Connect Device Identification No. | Routing Path | Agreement (Y/N) | Profile | |
|---|---|---|---|---|---|---|
| www.att.com | ATT World Wide Network | 203.54.27.5..... | VPN Routing | Y | Profile | |
| www.starpower.net | Erols Internet Access | 100.25.00.34... | Last Routing Path | N | | |
| www.aol.com | AOL Net | 226.643.2.00.... | Build Path As Needed | Y | Profile | |
| | | | | | | |
| | | | | | | |
| www.prodigy.com | IBM Internet | Channel 5, Port 3 | Dedicated Line | Y | Profile | |
| | | | | | | |

NETWORK ACCESS USING NETWORK IDENTIFICATION

CROSS REFERENCE TO RELATED APPLICATIONS

This application is a continuation of U.S. patent application Ser. No. 12/467,841, filed on May 18, 2009 now U.S. Pat. No. 7,805,521, entitled "NETWORK ACCESS USING NETWORK IDENTIFICATION" which is currently allowed and is a continuation of Ser. No. 09/968,528 (now U.S. Pat. No. 7,548,978) filed on Oct. 2, 2001, entitled, "NETWORK ACCESS USING NETWORK IDENTIFICATION" which also claims priority under 35 USC §119(e) to U.S. provisional patent application Ser. No. 60/237,438 filed on Oct. 3, 2000. Each of the above cited applications is herein incorporated by reference in its entirety.

FIELD OF THE INVENTION

This invention relates to a system and method for network access through foreign networks.

DESCRIPTION OF RELATED ART

In an increasingly fast-paced world, more and more people are often outside a service area of their telecommunication service provider, necessitating use of foreign networks to access their home service providers. For example, Sprint customers, while traveling, may have to connect and route through an accessible service provider, perhaps operated by AT&T, to access their home network provided by Sprint. Thus, technology is required to enable access of foreign networks.

SUMMARY OF THE INVENTION

This invention identifies a home network of an accessing user by using a network identification in an access request. When the access request is received, an accessed network determines if the accessing user is a subscriber or a non-subscriber (i.e., a roamer) relative to the accessed network by using network identification information contained in the request such as a domain .name.

The accessed network examines the access request to extract a home network identification. If the home network identification identifies the accessed network, then the accessing user is a subscriber of the accessed network and subscribed to services are provided to the accessing user accordingly. However, if the identification does not identify the accessed network, then a foreign network is identified and a network identification database is consulted to retrieve contact information for the foreign network. If the contact information is successfully retrieved, then the user may be routed to the foreign network (home network of the user). Otherwise (if the contact information is not in the network identification database), the user may be denied any access, and a purchase agreement for connect services may be offered.

BRIEF DESCRIPTION OF THE DRAWINGS

The invention will be described with reference to the following figures, wherein like numerals represent like elements, and wherein.

DETAILED DESCRIPTION OF PREFERRED EMBODIMENTS

Users who subscribe to a network access service may not always be in a position to access a subscribed to network (home network). When users attempt to access a network that is not their home network (i.e., a foreign network), and there are no agreements, contracts, etc. between the home network and the foreign network for the users to take advantage of services offered by the foreign network, then users are forced to locate a server (e.g., find a long distance telephone number) of their home network so that a server of the home network may be accessed for desired communication services. Unfortunately, often times, home networks do not have low cost access numbers (e.g., local telephone numbers) from all possible accessing locations. Thus, in order to access the home networks in locations where low cost access is not available, long distance fees must be incurred, for example.

This invention provides a technique that allows a user to access a home network through a foreign network. Thus, the user may take advantage of low cost access made available by the foreign network as well as the convenience of familiar home network services in accessing locations that are normally not supported (no low cost access to the home network) by the home network. Instead of relying on a direct dial in to a server of the home network via a modem, for example, a user may access a foreign network and identify the home network using a network identification parameter of the home network embedded in an access request. The foreign network may then connect the user to the home network based on the network identification.

The network identification allows any network to determine whether an accessing user is a subscriber or a non-subscriber of that network, and if a non-subscriber, whether the accessing user can be connected to the desired home network. Network service providers may agree with one another to provide connection services to each other's networks so that, from the user's perspective, the home network may be accessed using low cost connections from a much larger number of accessing locations. Indeed, if all network service providers join in an agreement, users of any network may access their respective home networks from any location where network access is available.

The network identification parameter may be a domain name (as opposed to a telephone number) of the home network, for example. A network service provider may have many servers, routers, etc. distributed in different locations. Access to a network service provider may be obtained via a connection to a properly equipped server (e.g., a server having a modem bank). Networks of many network service providers may link their networks together to form a large network such as the Internet, for example. The Internet, of course, may include any network such as network of suppliers, retailers, mail order houses, etc.

The Internet is organized in a domain structure. Thus, each of the network service providers may be identified by their domain name. Users subscribe to one of the network service providers to gain access to the Internet, for example. Thus, including the home network domain name as an identifier permits any network to recognize whether an access request is accessing itself or another network.

Figure 1:
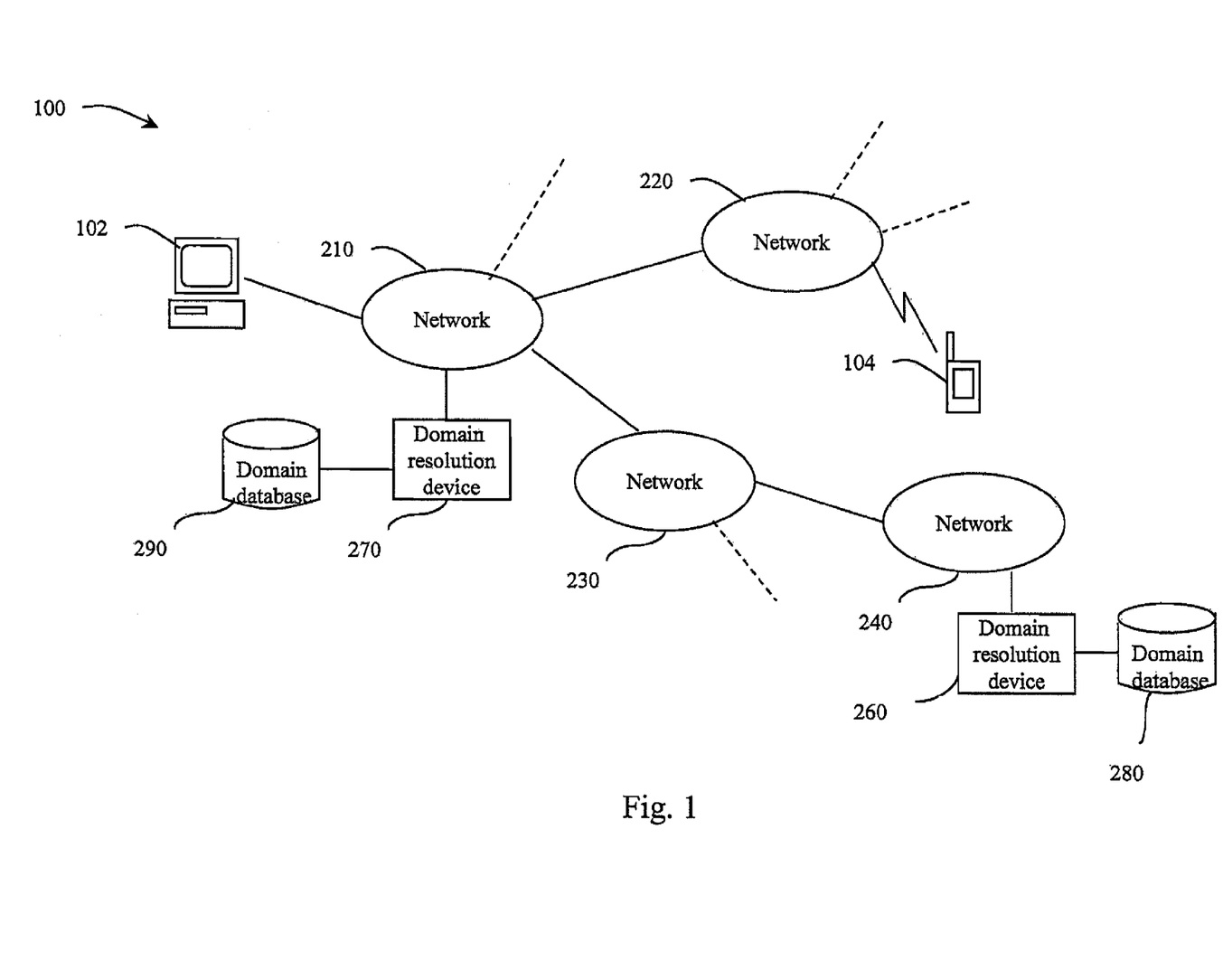
FIG. 1 shows an exemplary network identification resolution communication system.

FIG. 1 shows an exemplary network identification resolution communication system 100 that includes communication devices 102-104, networks 210-240 and network identification resolution devices 260 and 270, each coupled to respective domain databases 280 and 290. The networks 210-240 may be any type of communication networks that provide data access and/or connection services.

As an example, the networks 210 and 240 belong to network service providers that have an agreement to provide connection services to each other's subscribers while networks 220 and 230 belong to network service providers that do not belong to such an agreement. Thus, the networks 210 and 240 are coupled to the network identification resolution devices 260 and 270 for resolution of network identifications to connect accessing users to their home networks (i.e., networks 210 or 240). For ease of discussion, it is assumed that the networks 210-240 all participate in providing in connection services for each other (with appropriate remuneration) so that a user may be connected to any of the networks 210-240 from any other network 210-240. If such an assumption is not valid for a network, then connections cannot be made through that network.

While the domain name is used as an example of network identification, other types of network identification may also be used. For example, many items of information that are used to establish a data communication session with the home network such as the subscriber's account number with the home network may be a unique network identification of the home network. The subscriber's name may also uniquely identify the home network when the subscriber only subscribes to a single home network. In fact, any combination of the information used to establish a data communication session with the home network potentially may be used as a network identification.

When a user accesses the network 210, the network 210 extracts a domain name from the access request, and determines whether the access request is from a subscriber by searching for the domain name using the network identification resolution device 270. If the domain name is found by the network identification resolution device 270 and the network associated with the domain name corresponds to the network 210, then the access request is from a subscriber, and subscribed to services is provided to the user.

If the domain name is found by the network identification resolution device 270 but corresponds to the network 220, for example, then the access request is from a non-subscriber and is requesting a connection to a foreign network relative to the network 210. In this case, the network 210 retrieves additional information from the network identification resolution device 270 to determine how to process the access request. For example, if the network 210 and the network 220 have a reciprocity agreement to route each others subscribers without additional charge, then the network 210 may further retrieve routing information and connect the non-subscriber to the network 220. If the agreement between the network 210 and the network 220 is to connect each others subscribers for a fixed fee; then the network 210 may return a message to the non-subscriber to prompt acceptance of the connection for a fee.

If the domain name cannot be found by the network identification resolution device 270, then the network 210 cannot offer to connect the non-subscriber to another network. Thus, the network 210 may assume that the non-subscriber does not subscribe to any network service and may proceed to offer a network access subscription to the non-subscriber.

While the network identification resolution device 270 is shown as a device that is separate from the network 210, the functions of the network identification resolution device 270 may be performed by servers that are part of the network 210. For example, interface programs of servers of the network 210 may incorporate the functions of the network identification resolution device 270. In this case, when an access request is received, the server may immediately determine whether the access request is received from a subscriber or a non-subscriber without accessing a network identification database. The network identification database may be accessed when the domain name of the access request does not correspond to the network 210. However, in the following discussion, the network identification resolution device 270 will be shown as a separate device so that its functions may be easily described.

Also, while the network identification databases are shown to be associated with each network identification resolution device 260, 270, it may be implemented in a centralized manner. For example, a single database facility accessible to all network identification resolution devices 260, 270 may maintain all domain name resolution information. When a network identification resolution is required, the network identification resolution device remotely accesses the network identification databases to resolve network identifications. The database also may be partially distributed by establishing databases located in strategic geographic areas that contain domain name information for a specified portion of the domain names.

Further, even if each of the network identification resolution devices has a local database, each of the databases may contain only a portion of the network identifications, for example. When a network identification is not found in a local database, then the network identification resolution device 260, 270 may search other databases for the network identification until the network identification is either found or determined to be not in any of the databases.

Figure 2:
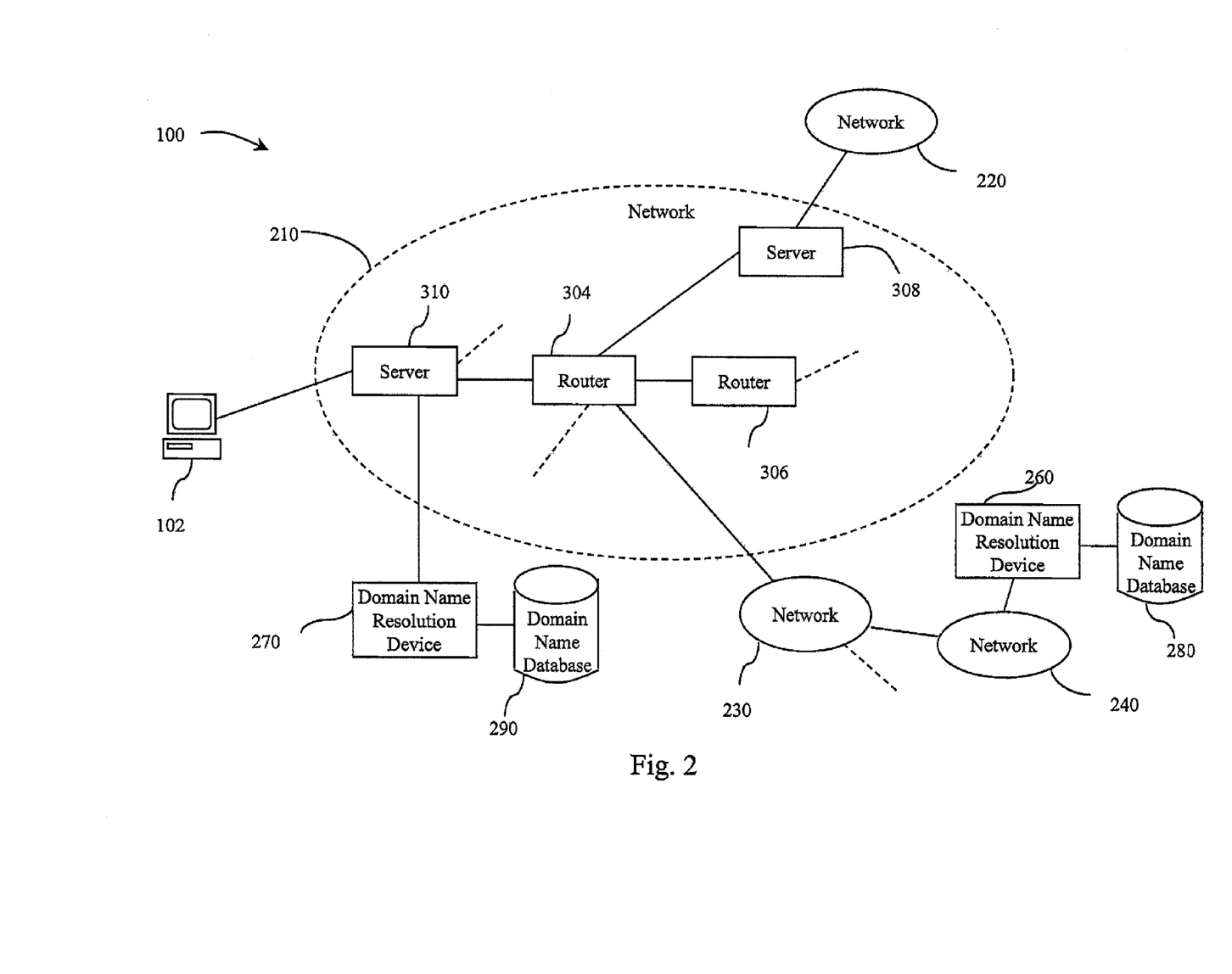
FIG. 2 shows greater detail of one of the networks shown in FIG. 1.

FIG. 2 shows the network identification resolution communication system 100 with the network 210 expanded in greater detail, as an example. The network 210 may include servers 308-310 and routers 304-306. The server 310 is connected to the network identification resolution device 270, the server 308 is connected to the network 220 and the router 304 is connected to the network 230.

When an access request is received from the communication device 102, the server 310 extracts a domain name from the access request and sends it through the network identification resolution device 270. If the domain name corresponds to the network 210, the network identification resolution device 270 informs the server 310 which in turn provides the subscribed to service (e.g., Internet access) to the communication device 102. If the domain name corresponds to the network 240, then the network identification resolution device 270 informs the server 310 accordingly. The server 310 may retrieve additional information from the network identification resolution database 290 to determine whether there is an agreement between the network 240 and the network 210 to provide connection services for subscribers of the network 240. If such an agreement is found, the server 310 determines a routing path for the communication device 102 to be connected to the network 240.

For the network configuration shown in FIG. 2, the server 310 may route the communication device 102 through the router 304 and then the router 230 to connect the communication device 102 to the network 240. While not shown in FIG. 2, there may be other switching equipment between the communication device 102 and the server 310 so that a routing path not involving the server 310 may also be used to route the communication device 102 to the network 240 in an efficient manner.

For example, the network 210 may use various routing techniques depending on specific circumstances such as anticipated traffic, congestion conditions, etc. If the network 210 expects to receive only an occasional access request connection to the network 240, then the pathway may be set up on the fly based on available resources at the time of the request. However, if a large number of requests or a constant level of requests are expected, for example, then the networks 210 and 240 may choose to set up a virtual private network (VPN) between networks 210 and 240 so that more efficient service may be offered. Other routing techniques may also be used as is well known to one of ordinary skill in the art.

If the access request received from the communication device 102 includes a domain name that corresponds to the network 220, for example, and there is no agreement between the network 210 and the network 220, then the network identification resolution device 270 may not find the domain name in the network identification database 290. If the domain name cannot be found, the server 310 cannot connect the communication device 102 to the corresponding foreign network. In this case, the server 310 may send a message to the communication device 102 that offers a number of options such as: (1) connect to a specific device identification number for a fee; (2) a subscription for access services.

If the domain name received from the access request is found in the network identification database 290 and a destination network is identified, but there is no agreement between the network 210 and the identified network, then the server 310 may offer either connection services to connect a communication device 102 to the destination network or offer network access services so that the communication device 102 may access the network directly through the network 210.

Figure 3:
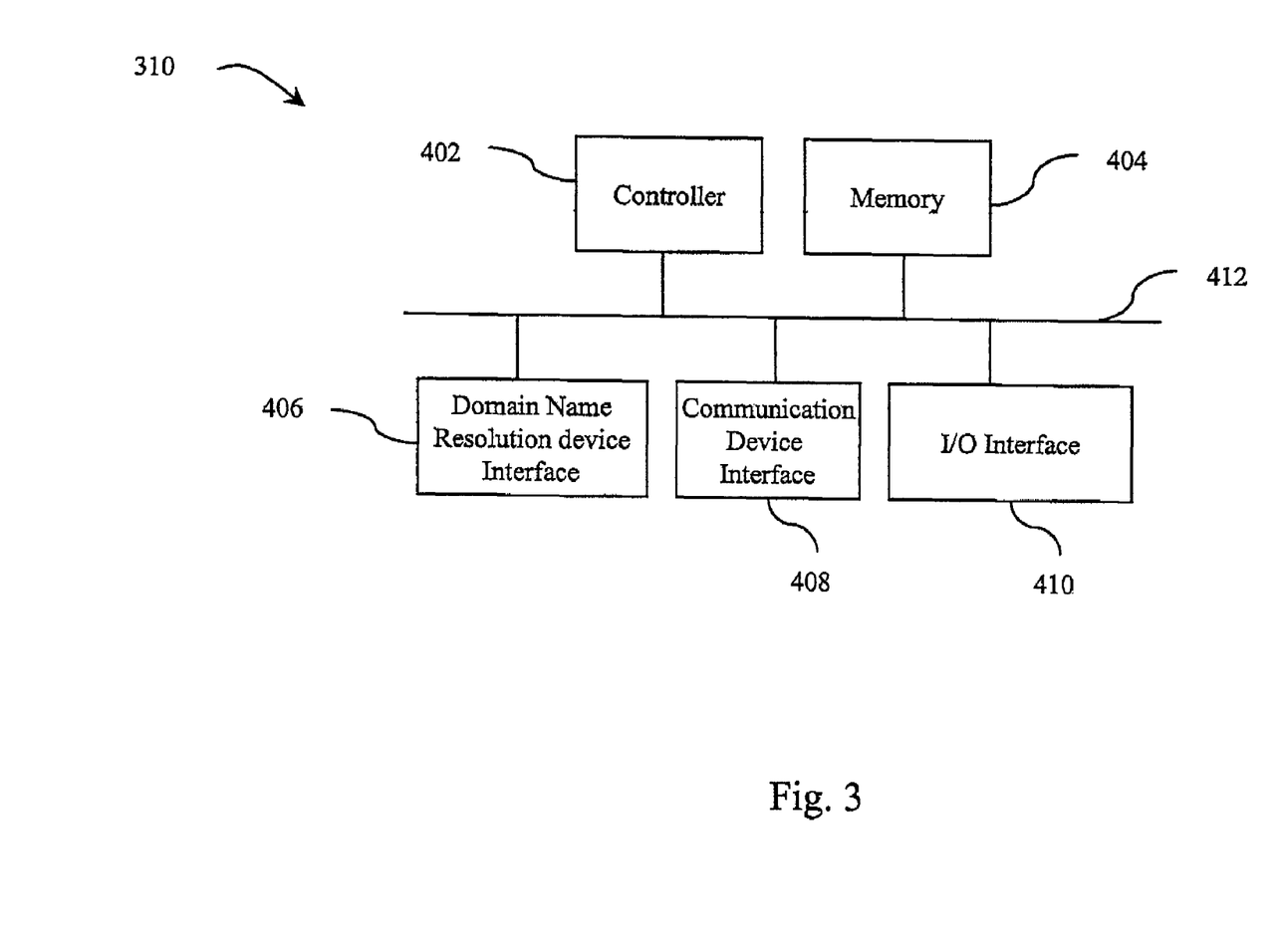
FIG. 3 shows an exemplary block diagram of a network server.

FIG. 3 shows an exemplary block diagram of the server 310 which may include a controller 402, a memory 404, a network identification resolution device interface 406, a communication device interface 408, and an I/O interface 410. The above components maybe coupled together via a bus 412. While the server 310 is shown in a bus architecture, other architectures may also be used as is well known in the art.

When an access request is received through the communication device interface 408, the controller 402 may either command the domain name to be sent to the network identification resolution device interface 406 to determine the corresponding network or the controller 402 may choose to receive the domain name immediately to determine whether the access request is received from a subscriber.

For example, the controller 402 may store domain names that correspond to the network 210 either in the memory 404 or in registers of the controller 402 so that immediate determination may be made as to whether the access request is received from a subscriber. Domain names of other networks may also be stored in the memory 404 for efficiency reasons. For example, if a large number of access requests is expected for other networks that have connection agreements with the network 210, the corresponding domain names may be stored in the memory 404 so that efficient determination of subscribers to these other networks may be achieved.

If the domain name retrieved from the access request is found in the memory 404, the controller 402 performs the appropriate action such as providing network access service to the subscriber or connecting the requesting device to the requested network via the I/O interface 410.

If the domain name is not found in the memory 404 (i.e., a foreign network), the controller 402 may send the domain name to a network identification resolution device 270 via the network identification resolution device interface 406. If the domain name and a corresponding network are found by the network identification resolution device 270, the controller 402 receives the network identification and associated routing information via the network identification resolution device interface 406. If the foreign network has an agreement for connecting subscribers, the controller 402 connects the requesting device to the foreign network via the I/O interface 410.

If the network 210 does not have an agreement with the foreign network, the controller 402 may offer to the requesting device connection services to the foreign network for a fee. The controller 402 may also negotiate with the foreign network via the I/O interface 410 to arrive at an agreement to connect the requesting device to the foreign network. If such an agreement is reached, the controller 402 connects the requesting device to the foreign network via the I/O interface 410. If the network identification resolution device 270 does not find the domain name, the controller 402 may offer to the requesting device network access services.

Figure 4:
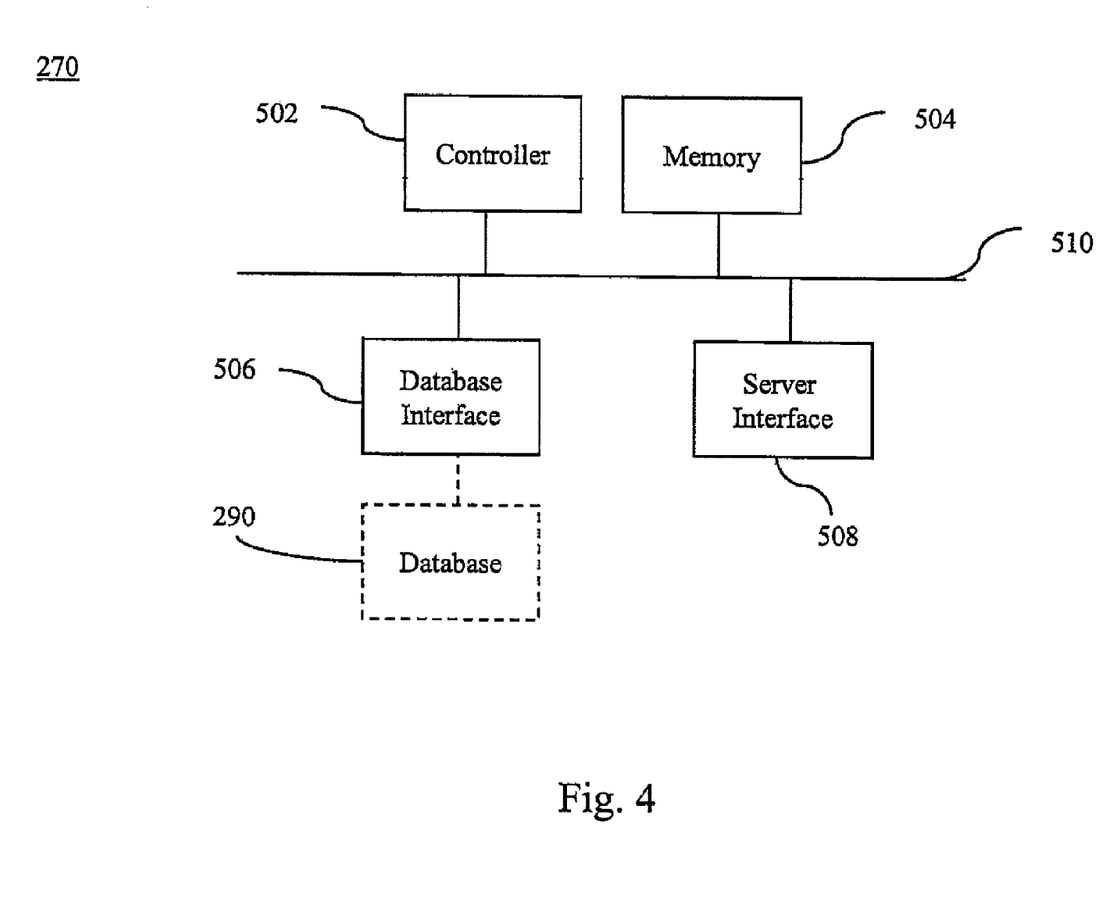
FIG. 4 shows an exemplary block diagram of a network identification resolution device.

FIG. 4 shows an exemplary block diagram of the network identification resolution device 270 that includes a controller 502, a memory 504, a database interface 506 and a server interface 508. The above components are coupled together via bus 510. When a domain name is received via the server interface 508 from the controller 402 of the server 310; the controller 502 accesses the-database 290 via the database interface 506 using the domain name as a search word, for example. If the domain name is found in the database, then the controller 502 may query whether there is an agreement between the network 210 and the foreign network identified by the domain name. If the domain name does not exist in the database 290, the controller 502 may set a domain name not found flag in a message to the controller 402 of the server 310.

If there is an agreement between the network 210 and the foreign network, the controller 502 may further retrieve foreign network information and sends the foreign network information to the server 310 via the server interface 508.

Figure 5:
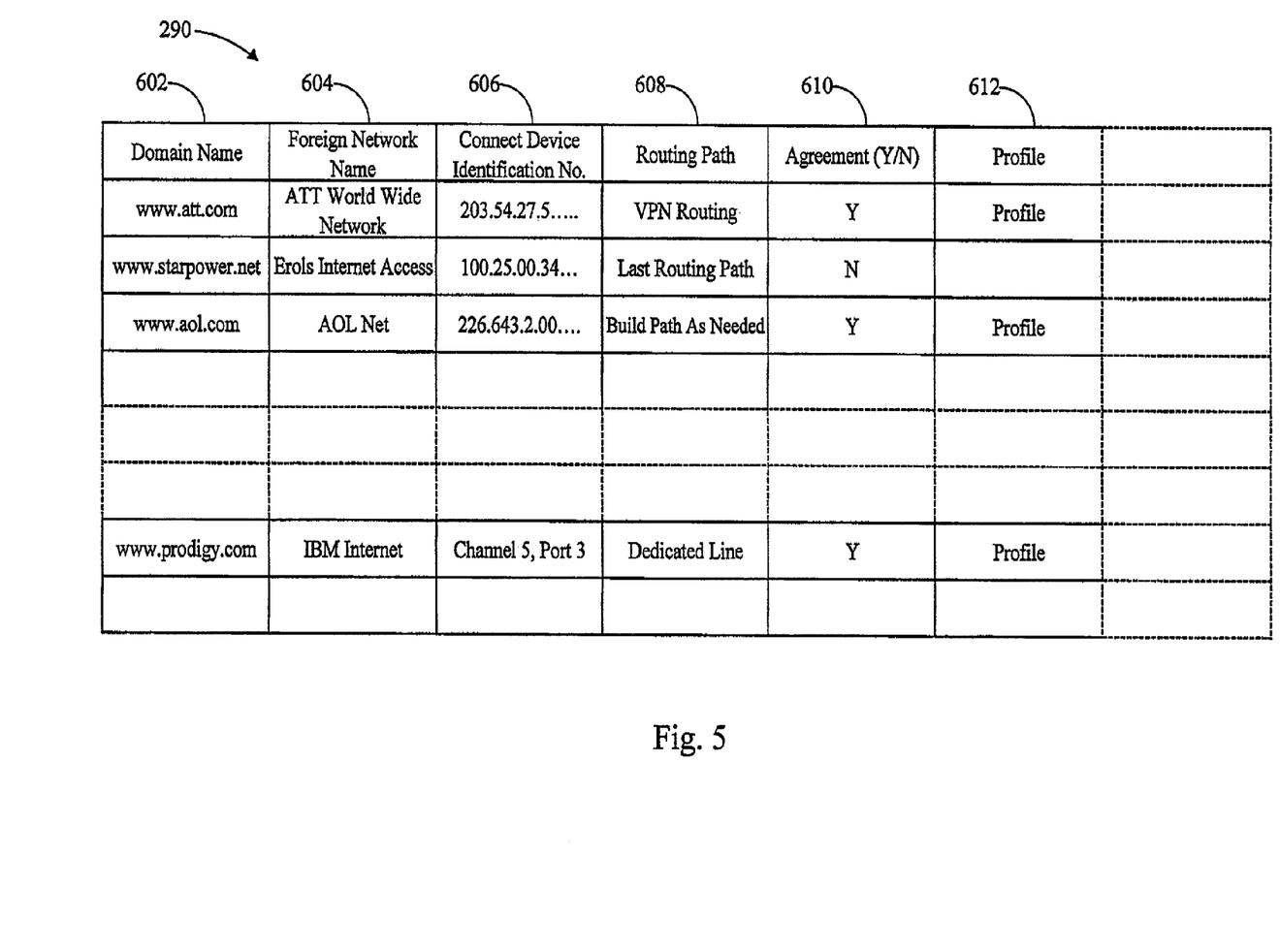
FIG. 5 shows an exemplary diagram of a network identification resolution database.

FIG. 5 shows an example of the database 290 that may include a domain name field 602, a foreign network name field 604, a connect device identification number field 606, a routing path field 608, an agreement field 610 and a profile field 612. The domain name field 602 may include domain names that are known to the network identification resolution device 270. For example, domain names may be www.at-t.com, www.starpower.net, www.aol.com and www.prodigy.com.

The foreign network identification field 604 may include one or more names identifying the foreign network. This information may be used to bill the foreign network for the connection service, for example. The connect device identification number field 606 may be an actual address of a server of the foreign network that serves as an entry port to the foreign network. Thus, if the communication device 102 requested access to a domain name that is found in the domain name field 602, then the network 210 will seek to connect the communication device 102 to a device at the address identified in the connect device identification number field 606.

The routing path field 608 may indicate a routing path between the network 210 and the foreign network. For example, www.att.com may be reached via a virtual private network (VPN). Thus, for this case, a VPN identification number may be placed in the routing path field 606.

As shown in FIG. 5, the routing paths to the various foreign networks may be of varying types ranging from building the path as needed to a dedicated line. The routing path to the domain name www.starpower.net indicates last routing path. This suggests that the controller 502 may update the database 290 using the latest information available. In storing the last routing path and perhaps adding a date (not shown) of when the last time the routing process was performed for this particular foreign network corresponding to the domain name, some efficiency may be gained by taking advantage of results of prior processes that may be reused.

The agreement field 610 may indicate whether an agreement between the network 210 and the respective foreign network is in place. The profile field 612 may include details of the agreement or what actions to take if an agreement is not in place. For example, if an agreement is not in place, the profile field may indicate the actions that may be taken such as contact the foreign network to immediately negotiate an agreement for this particular request, or to offer the requesting device a subscription contract.

The profile filed 612 may include a pointer to a profile that may include information agreed upon between the networks. The profile may include information providing procedures that control how a subscriber of the corresponding foreign network-should be treated. For example, the agreement may specify that the network 210 may mimic the foreign network subscriber interface by displaying a standard initial screen. The initial screen may include the foreign network logo and features offered by the foreign network, for example. More advanced features of the profile may also be provided such as storing profiles of specific subscribers of the foreign network so that any tailoring of the initial screen may be performed for each subscriber of the foreign network.

Figure 6:
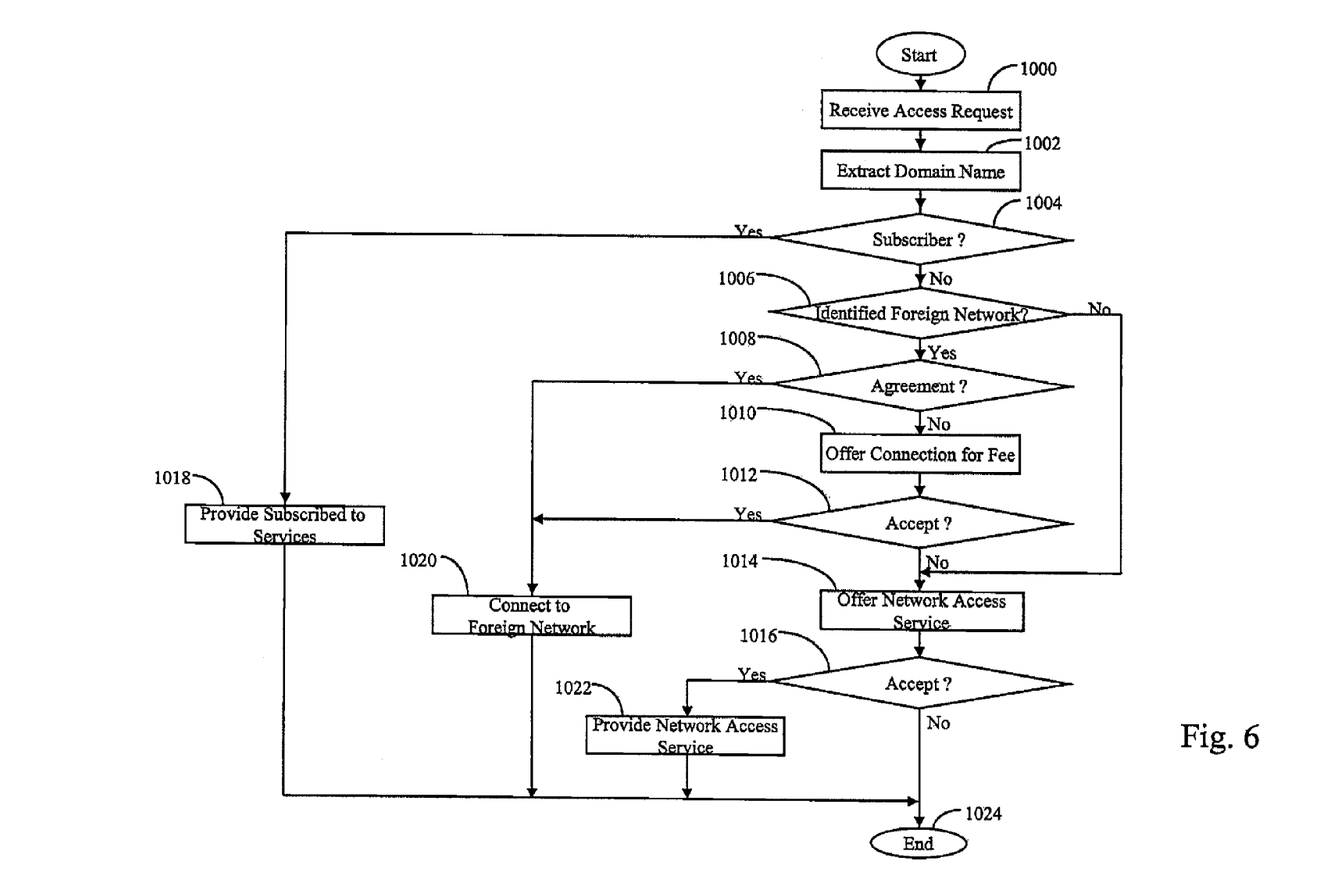
FIG. 6 shows an exemplary flowchart of a process of a network server.

FIG. 6 shows an exemplary flow chart for a process performed by the controller 402 of the server 310. In step 1000, the controller 402 receives an access request and goes to step 1002. In step 1002, the controller 402 extracts a domain name from the access request and goes to step 1004. In step 1004, the controller 402 determines whether the domain name corresponds to the network of which the controller 402 is a part. If so, the controller 402 goes to step 1018; otherwise, the controller 402 goes 10 step 1006. In step 1018, the controller 402 provides subscribed to services to the requesting device and goes to step 1024 and ends the process.

In step 1006, the controller 402 determines whether a foreign network has been identified. If identified, the controller 402 goes to step 1008; otherwise, the controller 402 goes to .step 1014. In step 1008, the controller determines whether an agreement has been established with a foreign network. If established, the controller 402 goes to step 1020; otherwise, the controller 402 goes to step 1010. In step 1020, the controller 402 connects the requesting device to the foreign network and goes to step 1024 and ends the process.

In step 1010, the controller 402 offers to the requesting device to connect the requesting device to the foreign network for a fee and goes to step 1012. In step 1012, the controller 402 determines whether the requesting device accepted the offer for connection. If accepted, the controller 402 goes to step 1020; otherwise, the controller 402 goes to step 1014.

In step 1014, the controller 402 offers to provide network access service to the requesting device and goes to step 1016. In step 1016, the controller 402 determines whether the offer for network access service has been accepted. If accepted, the controller 402 goes to step 1022; otherwise, the controller 402 goes to step 1024 and ends the process. In step 1022, the controller 402 provides the network access service and goes to step 1024 and ends the process.

Figure 7:
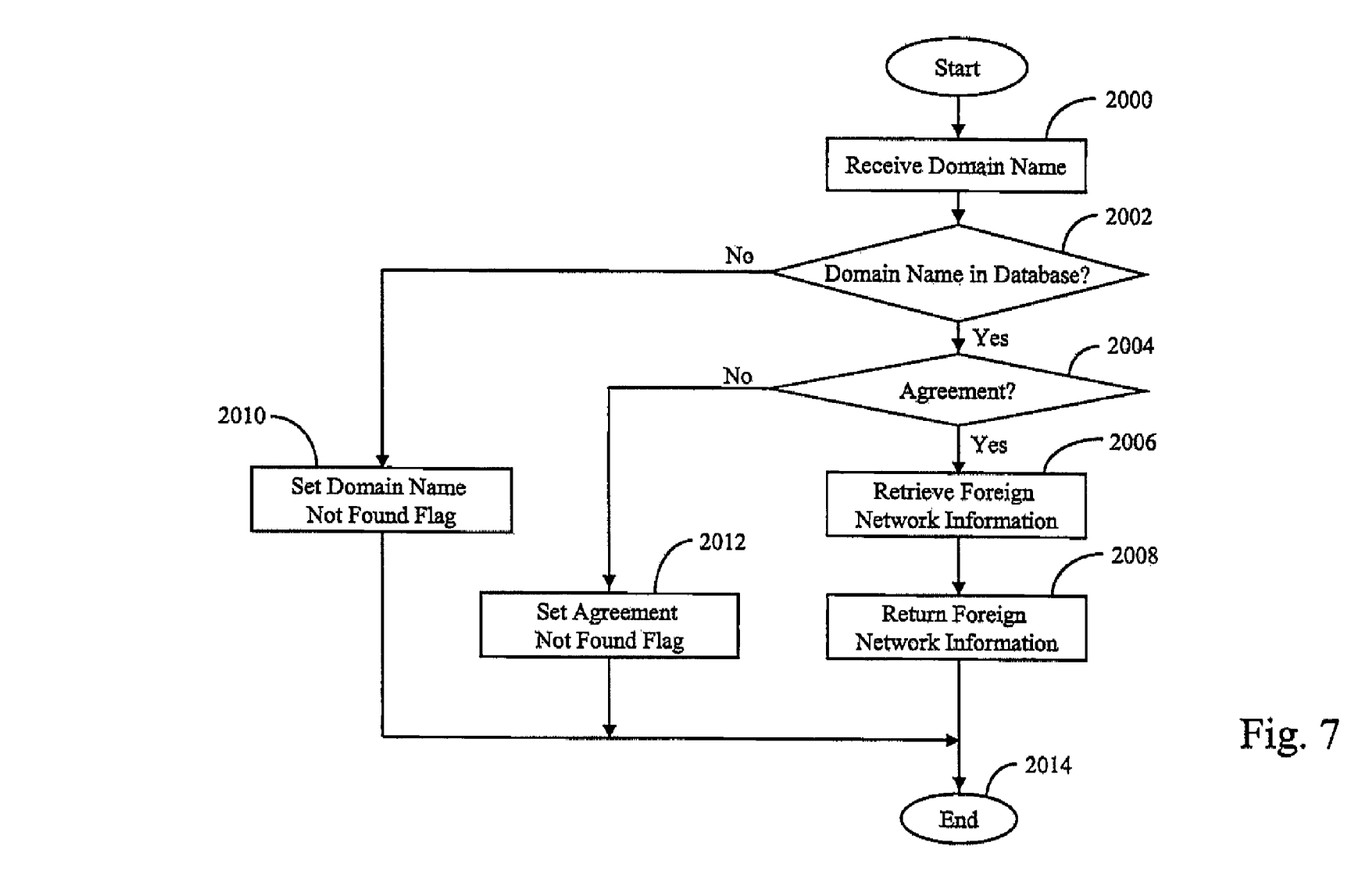
FIG. 7 shows an exemplary flowchart of a process of a network identification resolution device.

FIG. 7 shows an exemplary flow chart for the process of the network identification resolution device 270. In step 2000, the controller 502 receives a domain name and goes to step 2002. In step 2002, the controller 502 determines whether the domain name is found in an attached network identification resolution database. If found, the controller 502 goes to step 2004; otherwise the controller 502 goes to step 2010. In 2010, the controller 502 sends a domain name not found flag in a message to a requesting server such as server 310 and goes to step 2014 and ends the process.

In step 2004, the controller 502 determines whether an agreement exists with the foreign network. If it exists, the controller 502 goes to step 2006; otherwise, the controller 502 goes to step 2012. In step 2012, the controller 502 sends an agreement not found flag in a message to the requesting server and goes to step 2014 to end the process.

In step 2006, the controller 502 retrieves foreign network information. Such information may include routing paths, a profile corresponding to the foreign network, etc. and goes to step 2008. In step 2008, the controller 502 returns the foreign network information to the requesting server and goes to step 2014 and ends the process.

While this invention has-been described in conjunction with specific embodiments thereof, it is evident that many alternatives, modifications, and variation will be apparent to those skilled in the art. Accordingly, preferred embodiments of the invention as set forth herein are intended to be illustrative, not limiting. Various changes may be made without departing from the spirit and scope of the invention.

What is claimed:

1. A method for responding to an access request from a device, comprising:
   receiving the access request from the device;
   extracting a network identification from the access request;
   identifying a foreign network based on the network identification;
   obtaining foreign network information relating to the foreign network;
   obtaining a profile from the foreign network information if the foreign network information indicates that an agreement is not established with the foreign network;
   negotiating with the foreign network for connecting the device to the foreign network; and
   connecting the device to the foreign network if a successful negotiation is achieved.

2. The method of claim 1, wherein the foreign network information is obtained by retrieving the foreign network information from a network identification resolution database.

3. The method of claim 1, wherein the network identification comprises a domain name of the foreign network.

4. The method of claim 1, wherein the network identification comprises a subscriber account number.

5. The method of claim 1, wherein the network identification comprises a subscriber name.

6. The method of claim 1, wherein the network identification comprises a combination of a domain name of the foreign network, a subscriber account number, and a subscriber name.

7. The method of claim 1, wherein the connecting is performed in accordance with anticipated traffic.

8. The method of claim 1, wherein the connecting is performed in accordance with a congestion condition.

9. A method for responding to an access request from a device, comprising:
- receiving the access request from the device;
- extracting a network identification from the access request;
- identifying a foreign network based on the network identification;
- obtaining foreign network information relating to the foreign network;
- obtaining a profile from the foreign network information if the foreign network information indicates that an agreement is not established with the foreign network;
- presenting an offer connecting the device to the foreign network for a fee; and
- connecting the device to the foreign network if the device accepts the offer.

10. The method of claim 9, wherein the foreign network information is obtained by retrieving the foreign network information from a network identification resolution database.

11. The method of claim 9, wherein the network identification includes a domain name of the foreign network.

12. The method of claim 9, wherein the network identification comprises a subscriber account number.

13. The method of claim 9, wherein the network identification comprises a subscriber name.

14. The method of claim 9, wherein the network identification comprises a combination of a domain name of the foreign network, a subscriber account number, and a subscriber name.

15. The method of claim 9, wherein the connecting is performed in accordance with anticipated traffic.

16. The method of claim 9, wherein the connecting is performed in accordance with a congestion condition.

17. A method for responding to an access request from a device, comprising:
- receiving the access request from the device;
- extracting a network identification from the access request;
- attempting to identify a foreign network based on the network identification;
- offering a network access service if a foreign network cannot be identified based on the network identification; and
- providing the network access service if the offering is accepted.

18. The method of claim 17, wherein the foreign network information is obtained by retrieving the foreign network information from a network identification resolution database.

19. The method of claim 17, wherein the network identification includes a domain name of the foreign network.

20. The method of claim 17, wherein the providing is performed in accordance with anticipated traffic.

* * * * *